United States Patent [19] [11] Patent Number: 4,673,542
Wigner et al. [45] Date of Patent: Jun. 16, 1987

[54] METHOD OF MAKING A FOAMED SEAT OR CUSHION HAVING INTEGRAL FASTENERS

[75] Inventors: Lauren R. Wigner, Sterling Heights; Zoltan I. Pandak, Utica, both of Mich.

[73] Assignee: General Motors Corporation, Detroit, Mich.

[21] Appl. No.: 744,760

[22] Filed: Jun. 14, 1985

[51] Int. Cl.$^4$ .............................................. B29C 67/18
[52] U.S. Cl. ................................. 264/46.7; 264/275; 425/DIG. 33
[58] Field of Search .......................... 425/3, DIG. 33; 264/46.7, 132, 263, 275

[56] References Cited

U.S. PATENT DOCUMENTS 3,248,758  5/1966  Schmitz et al. ...................... 249/134

FOREIGN PATENT DOCUMENTS 38-1224  2/1963  Japan .

Primary Examiner—Jan H. Silbaugh
Assistant Examiner—Leo Tentoni
Attorney, Agent, or Firm—William A. Schuetz

[57] ABSTRACT

A method for integrally forming in place on an exterior side of a foam seat or backrest cushion a hook or loop strip fastener. The method includes (1) providing a mold which defines a cavity in the shape of the cushion and with its member defining the exterior of the cushion being provided with an elongated recess whose bottom overlies an elongated magnet located in the mold, (2) providing an elongated fastener strip assembly comprising a thin plastic liner, a fastener strip having integral hook or loop fasteners facing toward the liner, an elongated steel strip located on the back side of the fastener strip, and a cloth backing strip whose side edges are adhesively secured to adjacent side edges of the liner to encapsulate the fastener strip and steel strip between the cloth backing and liner, (3) placing and laying the elongated fastener strip assembly liner side down into the recess of the mold so that the steel strip overlies the magnet whereby the latter by magnetic attraction holds the fastener strip assembly in place in the mold, (4) adding foam material to the mold whereby the cloth backing strip of the fastener assembly will be integrally secured to the foam cushion during the molding operation, and (5) opening the mold to remove the foam cushion and with the fastener strip assembly being secured thereto liner side up.

5 Claims, 6 Drawing Figures

METHOD OF MAKING A FOAMED SEAT OR CUSHION HAVING INTEGRAL FASTENERS

The present invention relates to a method of making a foamed vehicle seat or backrest cushion having integral fasteners for attachment to trim covers and, more particularly, to a method of making a foamed vehicle seat or backrest cushion having formed in place hook or loop fastener strips.

Heretofore, vehicle seats or backrest cushions have been provided in which hook or loop fastener strips have been secured to the cushions so as to enable outer trim covers having hook or loop fastener strips secured to their undersides to be removably secured to the cushions by pressing the fastener strips carried by the trim covers onto the fastener strips of the cushions. It is also known to mold hook or loop fastener strips in place on the exterior surfaces of foamed-in-place seat cushions. In one such practice, a hook or loop strip fastener having a removable cover is laid in the mold cavity with the cover side facing the mold surface defining the cavity. Then a tape is overlaid onto the back side of the strip fastener and glued to the mold. Thereafter, the foam seat is formed.

While the above recited methods for securing hook or loop strip fasteners to foam seats have been successfully employed, they nevertheless have their drawbacks. The strip fasteners which are adhesively secured to an already formed cushion can come loose through usage and time. In the above-noted foamed-in-place method, it is difficult to maintain the accuracy and location of the adhesively secured strip fastener in the mold cavity during the foam pour and cure cycle when forming the cushion. In addition, foam leakage into the hook or loop area can occur which reduces the ability of the fastener to retain its associated trim cover in place.

Accordingly, it is a broad object of the present invention to provide a new and improved method for molding a hook and loop fastener strip or strip means in place on a vehicle seat or backrest cushion during the molding operation therefor and wherein the method is simple and reliable for locating and retaining the fastener strip in place in the mold cavity during the molding operation and highly effective in preventing leakage of foam material into the hook or loop area of the fastener strip during the molding operation.

Another object of the present invention is to provide a new and improved method for integrally forming in place on an exterior side of a foam seat or backrest cushion a hook or loop strip fastener, and in which the method includes the steps of (1) providing a mold having a pair of members which are relatively movable between open and closed positions and which together define a mold cavity and with the member defining the exterior surface of the cushion being provided with an elongated recess whose bottom lies over an elongated magnet located in the mold, (2) providing an elongated fastener strip assembly comprising a thin plastic liner whose width is wider than the recess in the mold, a fastener strip means having a fastener strip with integral hook or loop fasteners facing toward the liner and a backing, preferably cloth, whose width is greater than the width of the fastener strip and approximately the same as the width of the liner and with adjacent side edge portions of the backing and liner being adhesively secured to each other to isolate the fastener strip and an elongated, thin steel strip located between the backing and the liner, (3) placing and laying the elongated fastener strip assembly liner side down into the recess so that the side edge portions of the liner and backing overlie adjacent interior surfaces of the cavity and so that the steel strip overlies the magnet in the mold, whereby the magnet by magnetic attraction will hold the fastener strip assembly in place, (4) adding or pouring foam material into the mold after it is closed to form the cushion and whereby the backing of the fastener strip assembly will be secured to the cushion, and (5) opening the mold and removing the formed cushion and with the fastener strip assembly being secured to the cushion liner side up. Optionally, the liner can be stripped from the cushion to expose the hook or loops of the strip fastener.

The present invention further resides in various novel constructions and arrangement of parts, and further objects, novel characteristics and advantages of the present invention will be apparent to those skilled in the art to which it relates and from the following detailed description of the illustrated embodiment thereof made with reference to the accompanying drawings forming a part of this specification and in which similar reference numerals are employed to designate corresponding parts throughout the several views, and in which.

Figure 1:
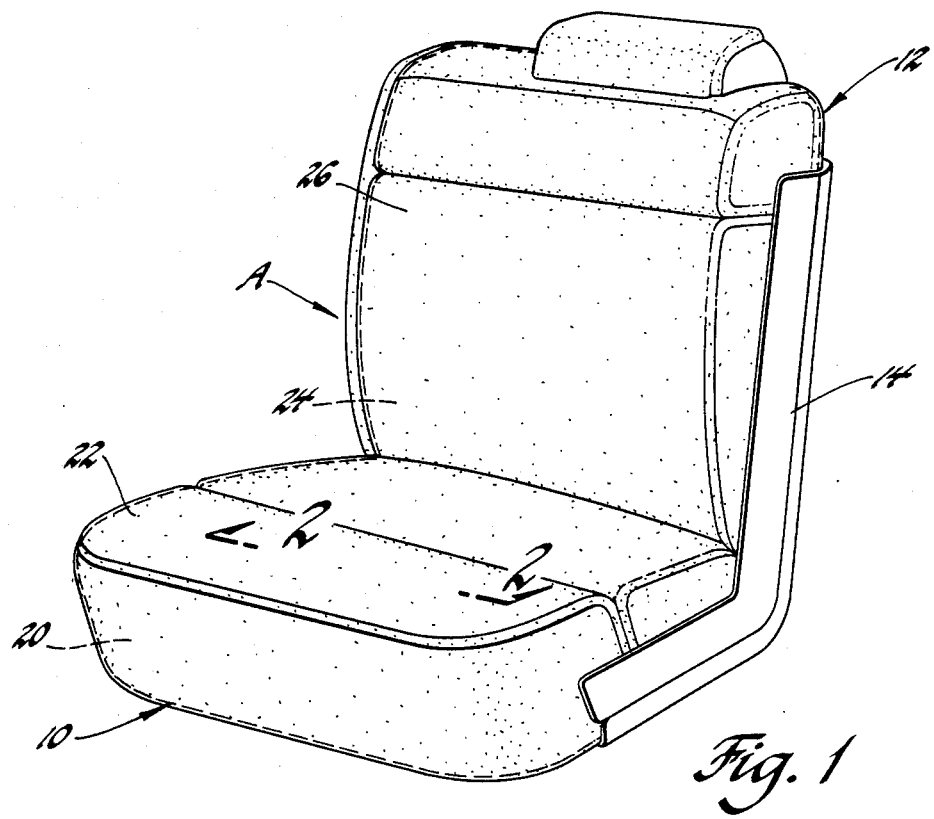
FIG. 1 is a perspective view of a vehicle seat.
Figure 2:
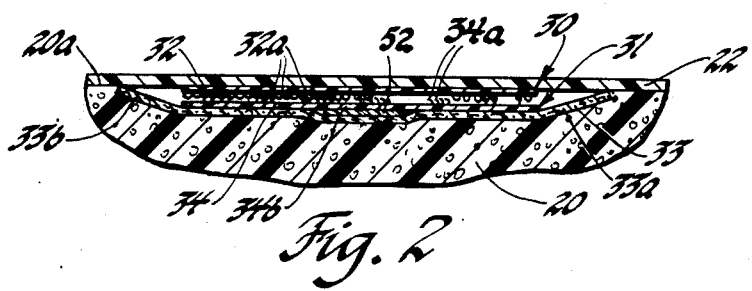
FIG. 2 is a fragmentary sectional view taken approximately along lines 2—2 of FIG. 1.
Figure 3:
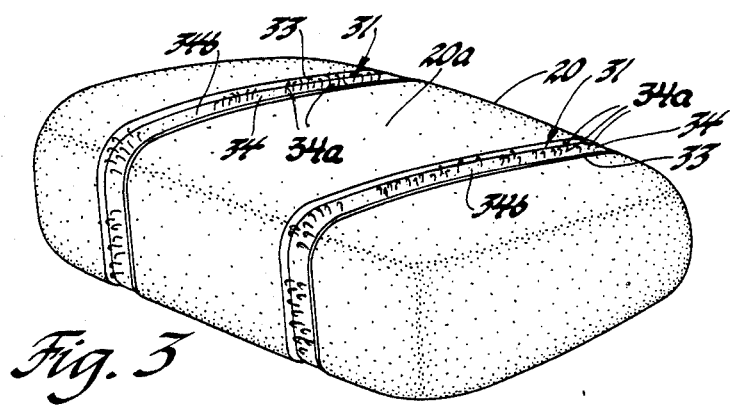
FIG. 3 is a perspective view of a foam seat cushion with hoop or loop fastener strips molded in place.

Referring to FIG. 1 of the drawings, a conventional vehicle seat A is there shown. The vehicle seat comprises a seat cushion unit 10, a seat backrest unit 12 and a pair of side supports 14 (only one of which is shown) to which the seat cushion and backrest cushion units 10 and 12, respectively, are secured. The side supports 14 in turn are adapted to be secured to a floor or bottom comprising part of an automotive vehicle body structure (not shown).

The seat cushion unit 10 comprises a foam seat cushion 20 and a trim cover 22. The seat backrest unit 12 comprises a foam backrest cushion 24 and a trim cover 26. The seat cushion 20 and backrest cushion 24 can be of the shape illustrated in FIG. 1 or be of any suitable shape, such as a bucket type seat cushion and backrest. The seat cushion 20 and backrest cushion 24 can be made from any suitable foam material, such as a polyurethane which is poured into a mold and allowed to set and cure to the shape of the mold, which shape corresponds to the shape of the cushion desired. The trim covers 22 and 26 can be made from any suitable material, such as cloth, leather or vinyl.

The trim cover 22 is secured and held in place on the cushion 20 via loop and hook fastener strip means or assemblies 30 and 31. For the sake of brevity, only the loop and hook fastener strip means 30 and 31 for the seat cushion unit 10 will be described in detail, it being understood that similar loop and hook fastener strip means are used to secure the trim cover 26 to the backrest cushion 24. The loop and hook fastener strip means 30 and 31 can be of any suitable or commercially available strip means such as that sold under the trademark Velcro. The fastener strip means 30 comprises an elongated plastic strip 32 having a multiplicity of loops 32a formed integral with and extending transversely of the strip 32. The strip 32 is suitably secured to the underside of the trim cover 22, such as by adhesively securing the same thereto. The fastener strip means 31 on the seat cushion 20 includes an elongated cloth backing strip 33 suitably secured to a plastic strip 34 having a multiplicity of hooks 34a formed integral with one side thereof. The cloth backing 33, in the preferred embodiment, is molded in place on the exterior side of the seat cushion 20 and, in a novel manner to be hereinafter more fully described. It should, of course, be understood that the loop strip fasteners 32 and cloth backing strip 33 could be molded in place on the cushion 20 and the hook strip fasteners 34 secured to the underside of the trim cover 22, if desired.

The trim cover 22 is removably secured to the seat cushion 20 by placing or sliding the trim cover 22 over the seat cushion 20 and then pressing the fastener strips 32 and 34 together; it being understood that the fastener strips 32 and 34 are aligned with each other when the trim cover 22 is placed over the adjacent seat cushion 20.

In accordance with the provisions of the present invention, a novel method is provided for forming the seat cushion 20 with the hook fastener strip means or assemblies 31 being molded in place on the exterior side 20a of the seat cushion 20 during the molding operation. The novel method comprises, in general, the steps of:

(1) providing a mold 40 which defines a mold cavity 42 in the shape of the cushion 20 and which has a main mold part 40a provided with elongated recesses 44 whose bottom surfaces lie over elongated magnets 46 located in the mold part 40a;

(2) providing an elongated fastener strip assembly 31 comprising a thin plastic liner 50 whose width is wider than the recess 44 in the mold 40a, a plastic fastener strip 34 with integral hook fasteners 34a facing toward the liner 50 and a backing 33 whose width is greater than the width of the fastener strip 34 and approximately the same as the width of the liner 50 and with adjacent side edges or portions 33a and 33b of the backing 33 and 50a and 50b of the liner 50, respectively, being adhesively secured together via an adhesive means 65 to isolate the fastener strip 34 and hooks 34a between the backing 33 and the liner 50, and an elongated thin steel strip 52 between the backing 33 and the fastener strip 34;

(3) placing or laying the elongated fastener strip assembly 31 liner side down into the recess 44 and with the side edges 50a and 50b of the liner 50 overlying the adjacent interior surfaces of the cavity 42 and so that the thin steel strip 52 lies over the magnet 46 so that the magnet by magnetic attraction will hold the fastener strip assembly 31 in place;

(4) pouring foam material into the mold 40 after it is closed and allowing the same to set and cure to form the cushion 20 and during which the cloth strip backing 33 of the fastener strip assembly 31 will be secured to the cushion 20;

(5) opening the mold 40 and removing the formed cushion 20; and (6) stripping the liner 50 from the strip fastener strip 34 secured to the cushion to expose the hooks 34a of the fastener strip 34.

Figure 4:
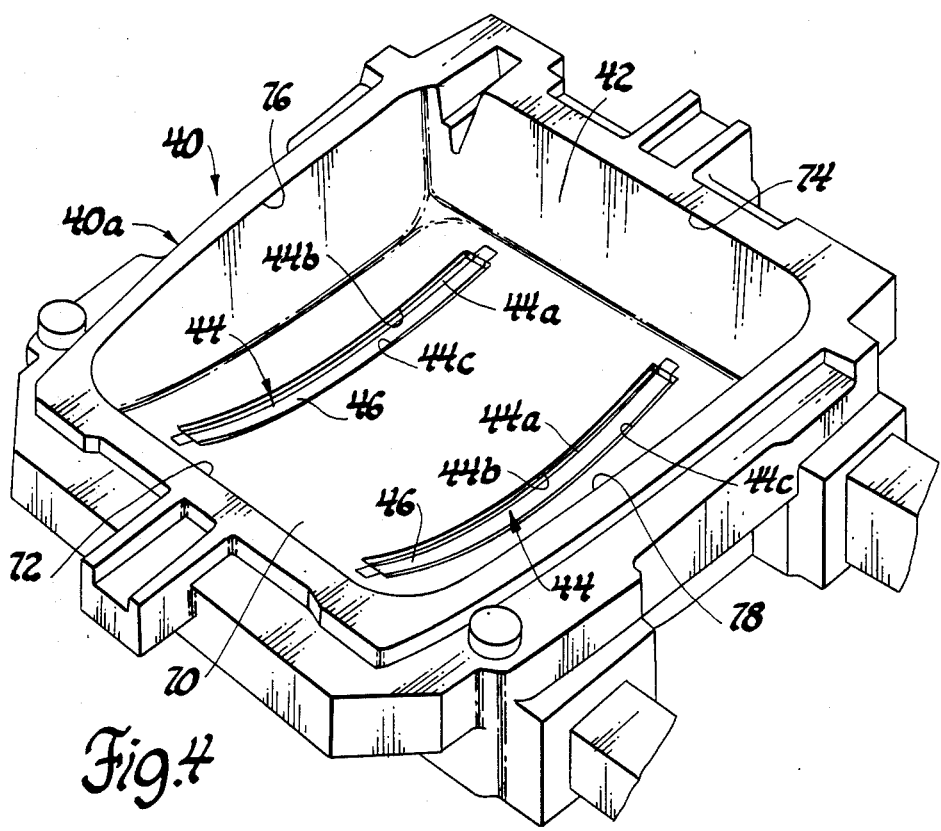
FIG. 4 is a fragmentary perspective view of a contoured mold part for making a foam seat.

The mold 40 can be of any suitable or conventional construction and is shown in FIG. 4 as including a main mold part or member 40a having a bottom 70, front and rear side walls 72 and 74 and left and right side walls 76 and 78. The mold 40 also includes a cover member (not shown) which is movable relative to the mold member 40a between open and closed positions to permit access to the mold interior. The bottom 70 and walls 72, 74, 76 and 78 of the mold member 40a together with the cover member (not shown) defines the mold cavity 42 having a shape in conformance with the shape of the seat cushion 20 to be formed. The bottom 70 of the mold member 40a is shaped or contoured such that it is in conformance to the desired shape of the exterior side 20a of the seat cushion 20.

The bottom 70 of the mold member 40a is provided with a pair of left and right elongated recesses 44, as viewed in FIG. 4, extending between the front and rear walls 72 and 74 thereof. Since both left and right recesses 44 are identical, only the left recess 44 will be described in detail.

Figure 5:
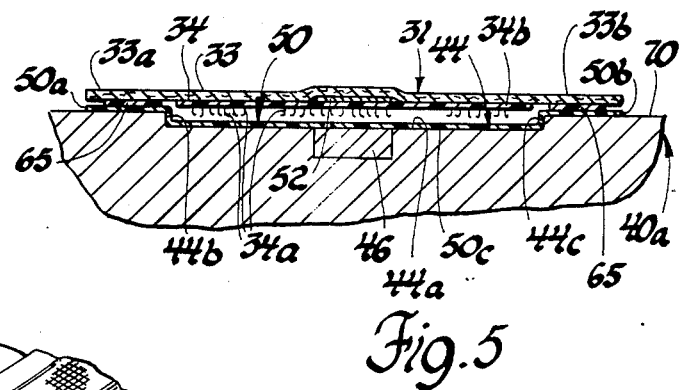
FIG. 5 is an enlarged cross sectional view of the mold part shown in FIG. 4 and showing an elongated fastener strip assembly laid in place in the mold.

As best shown in FIG. 5, the recess 44 is defined by a flat bottom 44a surface and a pair of side surfaces 44b and 44c extending transversely or perpendicularly of the bottom surface 44a and adjacent interior surfaces of the bottom 70 of the mold member 40a. Disposed and secured within the rectangularly shaped recess 44 and located directly beneath the bottom surface 44a of the recess 44 and equidistant between the side surfaces 44b and 44c thereof is an elongated permanent magnet 46. Although the permanent magnet 46 is shown as having its top surface flush with the adjacent bottom surface 44a of the recess 44, it should be understood that the magnet 46 could be located within an elongated opening disposed slightly beneath the bottom surface 44a of the recess 44.

The recess 44 and permanent magnet 46 are adapted to hold the strip fastener assembly 31 in place during the molding operation to make the foam seat cushion 20 and to enable the strip fastener assembly 31 to be integrally secured or molded to the exterior side 20a of the seat cushion 20 at the desired location thereon.

The fastener strip means or assembly 31 is elongated and includes the liner 50 of the strip fastener assembly 31 is an elongated thin strip of a suitable or conventional plastic material, such as nylon, and includes a center portion 50c, which is adapted to lie within the recess 44, and left and right side portions or edges 50a and 50b, as viewed in FIG. 5, which are adapted to overlie adjacently located bottom interior surfaces of the bottom 70 of the mold part 40a when the strip fastener assembly 31 is laid into the recess 44 of the mold part 40a.

The fastener strip means 31 further comprises a backing strip 33 made from a suitable or conventional cloth material and a plastic hook fastener strip 34 including a backing strip 34b and integrally formed hook fasteners 34a extending transversely from one side or face of the backing strip 34b. The hook fastener strip 34 can be made from any suitable or conventional plastic material, such as polypropylene, and has its backing strip 34b adjacent the side edges of the latter adhesively or otherwise secured to one side or face of the cloth backing strip 33 throughout the length of the fastener strip 34. The cloth backing strip 33 has sides or side portions 33a and 33b extending transversely of the fastener backing strip 34b and along its entire length.

The fastener strip assembly 31 also includes a thin, flexible, elongated steel strip 52 made of cold rolled steel. The steel strip 52 is located centrally between the cloth backing strip 33 and the backing strip 34b of the fastener strip 34. The steel strip is held in place relative to the backing strips 33 and 34b as a result of the backing strip 34b being secured adjacent its side edges to the cloth backing strip 33. The length of the steel strip 52 is co-extensive with the length of the magnet 46 and/or recess 44.

When the fastener strip assembly 31 is laid in the recess 44 of the mold part 40a, the steel strip 52 is attracted to the permanent magnet 46 by magnetic attraction, which serves to hold the fastener strip assembly 31 in place within the recess 44 and with the liner 50 being held against the bottom surface 44a of the recess 44 of the mold part 40a.

Figure 6:
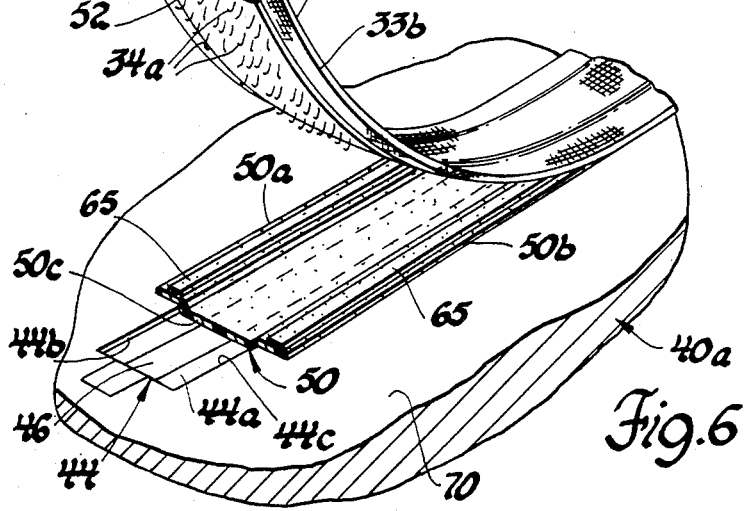
FIG. 6 is a fragmentary perspective view with parts shown in section of the mold part shown in FIG. 5 and illustrating the location and relationship of the different parts of the fastener strip assembly to each other and the mold.

The plastic fastener strip 34 is isolated from the mold cavity 42 as a result of being sandwiched between the liner 50 and cloth backing strip 33. To this end, the liner 50 at its sides or side portions 50a and 50b is adhesively secured to the sides or side portions 33a and 33b of the cloth backing strip 33 by the adhesive means 65. As shown in FIGS. 5 and 6, the sides 33a and 33b of the cloth backing strip 33 or the sides 50a and 50b of the liner 50, or both, carry the adhesive means 65 along their entire length. The cloth backing strip 33 is adhesively secured to the sides 50a and 50b of the liner 50 by laying the fastener strip 34 hook face down over the liner 50 and pressing the sides 33a and 33b of the cloth backing strip 33 onto the sides 50a and 50b of the liner 50.

After the fastener strip assembly 31 is laid into the recess 44 of the mold part 40a and thus, held in place therein via the steel strip 52 being magnetically attracted to the magnet 46, the cover member (not shown) of the mold 40 is moved to its closed position and the material for forming the foam seat cushion 20 is poured through a mold inlet (not shown). The cushion material, preferably a polyurethane, after being poured into the mold 40 is allowed to set and cure, and in a manner well known to those skilled in the art.

After the cushion 20 is formed, the mold cover (not shown) can be moved to its open position and the seat cushion 20 removed from the mold part 40a. When the seat cushion 20 is removed from the mold part 40a, the fastener strip assembly 31 as a unit will be integrally attached or secured to the exterior side 20a of the seat cushion 20. The foam material, during the seat forming process, will flow through the interstices of the cloth backing 33 and securely retain the cloth backing 33 onto the exterior side 20a of the seat cushion 20.

When the seat cushion 20 is removed from the mold 40, a midportion 50c of the liner 50, that is, the portion 50c not adhesively secured to the backing 33, can be readily removed from the fastener strip means 31 by peeling the same along the length of the fastener strip 34. Removing the midportion 50c of the liner 50 exposes the hooks 34a of the hook fastener strip 34. Thereafter, the seat cushion 20, with its hook fastener strip 34 securely retained on the exterior surface 20a thereof, is ready to receive the trim cover 22 carrying loop strip fasteners 32 aligned with the hook fasteners 34a of the fastener strips 34 on the seat cushion 20. By pressing the loop strip fasteners 32 carried by the trim cover 22 onto the hook strip fasteners 34 carried on the seat cushion 20, the trim cover 22 will be removably secured to the seat cushion 20.

It should be noted that the steel strips 52 remains a part of the strip fastener assembly or means 31 secured to the seat cushion 20, since it is highly flexible and does not interfere with seating comfort. Also, it should be noted that the plastic liner 50 could be made of a very thin material so that its midportion 50c when pressed against the hooks 34a by the fastener strip 32 on the trim cover 22, the hooks 34a will readily pierce the liner 50. This eliminates the need to peel off the midportion 50c of the liner 50 after the cushion 20 is removed from the mold 40. Also, if the liner 50 is not peeled off and depending upon the plastic material of the liner 50, the latter may partially or wholly disintegrate in the post molding treatment the foam cushion 20 is subjected to. As is common practice, the foam cushion 20 is usually put through a crusher (not shown) to break up the cells of the foam material while the foam cushion is still green to prevent shrinkage of the cushion and then passed through a curing oven (not shown) to cure the foam material and during which the liner 50 may partially or wholly disintegrate.

From the foregoing, it should be readily understood that a novel and effective method has been provided for making a seat cushion for a seat which has a hook or loop fastener strip means or assembly molded to its exterior surface. By providing a mold whose contoured bottom is provided with a recess and by providing a mold having permanent magnets embedded thereon for magnetically attracting and holding a steel strip of the fastener strip assembly in place in the mold recess enables a hook or loop strip thereof to be (1) accurately located within the mold cavity, (2) securely retained in place during the molding operation, (3) securely formed in place on the exterior of the seat cushion without any of the foam material leaking into the hook or loop area of the fastener strip and (4) to have its hook or loop side exposed, after the seat cushion molding operation, by merely peeling off the midportion of the liner of the fastener strip assembly.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. The method of making a cushion for a seat which has a hook or loop strip fastener means molded to its exterior surface comprising the steps of:
   (1) providing a mold having a pair of members which are relatively movable between open and closed positions and which together define a mold cavity and with the member defining the exterior surface of the cushion being provided with an elongated recess whose bottom lies over an elongated magnet located in the mold,
   (2) providing an elongated fastener strip assembly comprising a thin plastic liner whose width is wider than the recess in the mold, a fastener strip means having a fastener strip with integral hook or loop fasteners facing toward the liner and whose width is less than the width of said recess and a backing whose width is greater than the fastener strip and approximately the same as the width of the liner and with adjacent side edge portions of the backing and liner being adhesively secured to each other and an elongated, thin steel strip located between the backing and said liner and whose width is less than the width of said recess whereby said fastener strip and said thin steel strip are sandwiched between said liner and said backing and isolated from direct contact exteriorly of said fastener strip assembly, (3) placing and laying said fastener strip assembly liner side down into said recess of the mold so that the side edge portions of the liner and backing overlie the interior surface of the mold cavity and the steel strip overlies said magnet whereby said magnet by magnetic attraction will hold said fastener means within said recess and said fastener strip assembly in place in the mold cavity, (4) adding foam material into the mold after it is closed to form said cushion and whereby said backing of said fastener strip assembly will be secured to said cushion, (5) opening the mold and removing said formed cushion with the fastener strip assembly being secured to the exterior side of said cushion and with the liner facing exteriorly of said cushion.

2. The method of making a cushion for a seat which has a hook or loop strip fastener means molded to its exterior surface comprising the steps of:

(1) providing a mold having a pair of members which are relatively movable between open and closed positions and which together define a mold cavity and with the member defining the exterior surface of the cushion being provided with an elongated recess whose bottom lies over an elongated magnet located in the mold, (2) providing an elongated fastener strip assembly comprising a thin plastic liner whose width is wider than the recess in the mold, a fastener strip means having a fastener strip with integral hook or loop fasteners facing toward the liner and whose width is less than the width of said recess and a backing whose width is greater than the fastener strip and approximately the same as the width of the liner and with adjacent side edge portions of the backing and liner being adhesively secured to each other and an elongated, thin steel strip whose width is less than the width of said recess and which is sandwiched between the backing and said fastener strip means whereby said fastener strip and said thin steel strip are isolated from direct contact exteriorly of said fastener strip assembly, (3) placing and laying said fastener strip assembly liner side down into said recess of the mold so that the side edge portions of the liner and backing overlie the interior surface of the mold cavity and the steel strip overlies said magnet whereby said magnet by magnetic attraction will hold said fastener strip within said recess and hold said fastener strip assembly in place in the mold cavity, (4) pouring foam material into the mold after it is closed and allowing the same to rise and set to form said cushion and whereby said backing of said fastener strip assembly will be secured to said cushion, (5) opening the mold and removing said formed cushion with the fastener strip assembly being secured to the exterior side of said cushion and with the liner facing exteriorly of said cushion.

3. The method of making a cushion for a seat which has a hook or loop strip fastener molded to its exterior surface comprising the steps of:

(1) providing a mold having a pair of members which are relatively movable between open and closed positions and which together define a mold cavity and with the member defining the exterior surface of the cushion being provided with an elongated recess whose bottom lies over an elongated magnet located in the mold, (2) providing an elongated fastener strip assembly comprising a thin plastic liner whose width is wider than the recess in the mold, a fastener strip means having a fastener strip with integral hook fasteners facing toward the liner and whose width is less than the width of said recess and a cloth backing whose width is greater than the fastener strip and approximately the same as the width of the liner and with adjacent side edge portions of the cloth backing and liner being adhesively secured to each other and an elongated, thin steel strip whose width is less than the width of said recess and which is sandwiched between the cloth backing and said fastener strip means whereby said fastener strip and said thin steel strip are sandwiched between said liner and said backing strip and isolated from direct contact exteriorly of said fastener strip assembly, (3) placing and laying said fastener strip assembly liner side down into said recess of the mold so that the side edge portions of the liner and backing overlie the interior surfaces of the mold cavity adjacent the recess and the steel strip overlies said magnet whereby said magnet by magnetic attraction will hold said fastener strip means within said recess and said fastener strip assembly in place in the mold cavity, (4) pouring foam material into the mold after it is closed and allowing the same to rise and set fo form said cushion and whereby said cloth backing of said fastener strip assembly will be secured to said cushion, (5) opening the mold and removing said formed cushion with the fastener strip assembly being secured to the exterior side of said cushion and with the liner facing exteriorly of said cushion.

4. The method as defined in claim 1 and including the step of stripping said liner of said fastener strip assembly from said seat cushion after it is removed from the mold to expose said hook or loops of said strip fastener.

5. The method as defined in claim 3 and including the step of stripping said liner of said fastener strip assembly from said seat cushion after it is removed from the mold to expose said hooks of said strip fastener.

* * * * *